(12) United States Patent
Sampath et al.

(10) Patent No.: US 7,333,433 B2
(45) Date of Patent: Feb. 19, 2008

(54) MANAGING BANDWIDTH USING WEIGHTED REDUCTION

(75) Inventors: Rajagopalan Sampath, Bangalore (IN); Balakrishna P, Bangalore (IN); Sreenivasa Murthy T, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1091 days.

(21) Appl. No.: 10/299,241

(22) Filed: Nov. 18, 2002

(65) Prior Publication Data

US 2004/0095892 A1 May 20, 2004

(51) Int. Cl.
*H04L 12/28* (2006.01)
*H04J 3/16* (2006.01)

(52) U.S. Cl. .................. 370/232; 370/252; 370/468
(58) Field of Classification Search ............. 370/232, 370/235, 252, 468, 477
See application file for complete search history.

(56) References Cited

U.S. PATENT DOCUMENTS

| 6,510,137 | B1 * | 1/2003 | Belaiche ............. 370/232 |
|---|---|---|---|
| 6,813,284 | B2 * | 11/2004 | Vayanos et al. ......... 370/537 |
| 6,826,193 | B1 * | 11/2004 | Peisa .................. 370/437 |
| 6,850,540 | B1 * | 2/2005 | Peisa et al. ........... 370/468 |
| 6,904,016 | B2 * | 6/2005 | Kuo et al. ............. 370/235 |
| 6,985,473 | B2 * | 1/2006 | Vayanos et al. ......... 370/342 |
| 7,012,894 | B2 * | 3/2006 | Belaiche .............. 370/232 |
| 7,050,415 | B2 * | 5/2006 | Herrmann et al. ....... 370/338 |
| 2002/0114280 | A1 * | 8/2002 | Yi et al. .............. 370/235 |
| 2003/0035394 | A1 * | 2/2003 | Zeira et al. ........... 370/335 |
| 2004/0203402 | A1 * | 10/2004 | Zhang ................. 455/63.1 |
| 2004/0248582 | A1 * | 12/2004 | Belaiche et al. ........ 455/450 |
| 2005/0002366 | A1 * | 1/2005 | Toskala et al. ......... 370/338 |
| 2005/0018614 | A1 * | 1/2005 | Kiran ................. 370/252 |
| 2005/0259582 | A1 * | 11/2005 | Belaiche .............. 370/232 |
| 2006/0029098 | A1 * | 2/2006 | Marinier et al. ........ 370/468 |

* cited by examiner

*Primary Examiner*—Wing Chan
*Assistant Examiner*—Hong Sol Cho
(74) *Attorney, Agent, or Firm*—Kacvinsky LLC

(57) ABSTRACT

Techniques to manage bandwidth using weighted reduction are described wherein a combined instantaneous data rate for a set of logical channels is determined, a determination is made whether a transport format combination (TFC) is valid for the combined instantaneous data rate, and an instantaneous data rate for at least one of the logical channels is reduced using a weighted reduction technique. Other embodiments are described and claimed.

22 Claims, 5 Drawing Sheets

300

MANAGING BANDWIDTH USING WEIGHTED REDUCTION

BACKGROUND

Improvements in wireless communications have enabled wireless devices to communicate multimedia information. Once limited to voice communications, wireless devices are increasingly able to communicate other forms of information such as text, images, video, sounds, music, graphics and other forms of data. Further, wireless devices may communicate different types of information at the same time. Communicating multimedia information, however, may require special techniques to manage the available bandwidth used to carry such information. Consequently, there may be a need for improved techniques to manage bandwidth for communicating multimedia information.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to manage bandwidth using weighted reduction in a network, such as a wireless network. Current wireless devices may communicate different types of information having different priority levels and data rates. This communication may occur at the same time by separating the available bandwidth among one or more logical channels, with each logical channel communicating one type of information. For example, you may have one logical channel communicating voice information while another communicates data information. In some cases the combined data rates for the logical channels may exceed the available communications bandwidth for the wireless device. The embodiments attempt to reduce the data rates for the logical channels in an orderly fashion based on priority levels. More particularly, the embodiments use a weighted reduction technique to reduce data rates for one or more logical channels until the combined data rates of all the logical channels match the available communications bandwidth.

The term bandwidth as used herein may refer to several different aspects of a communication channel. For example, in one embodiment of the invention the term bandwidth may refer to the data rate of a channel, which typically refers to the data communicated in a defined time period (e.g., 300 bits per second). In one embodiment of the invention the term bandwidth may refer to the Buffer Occupancy (BO) of a channel, which typically refers to the size of the data to be transmitted (e.g., 300 bits). In one embodiment of the invention, the term bandwidth may refer to the instantaneous data rate of a channel, which typically refers to the data communicated at any particular instant of time. The embodiments may use the terms "data rate," "instantaneous data rate," "Buffer Occupancy" or variations thereof interchangeably when referring to the bandwidth of a logical channel.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
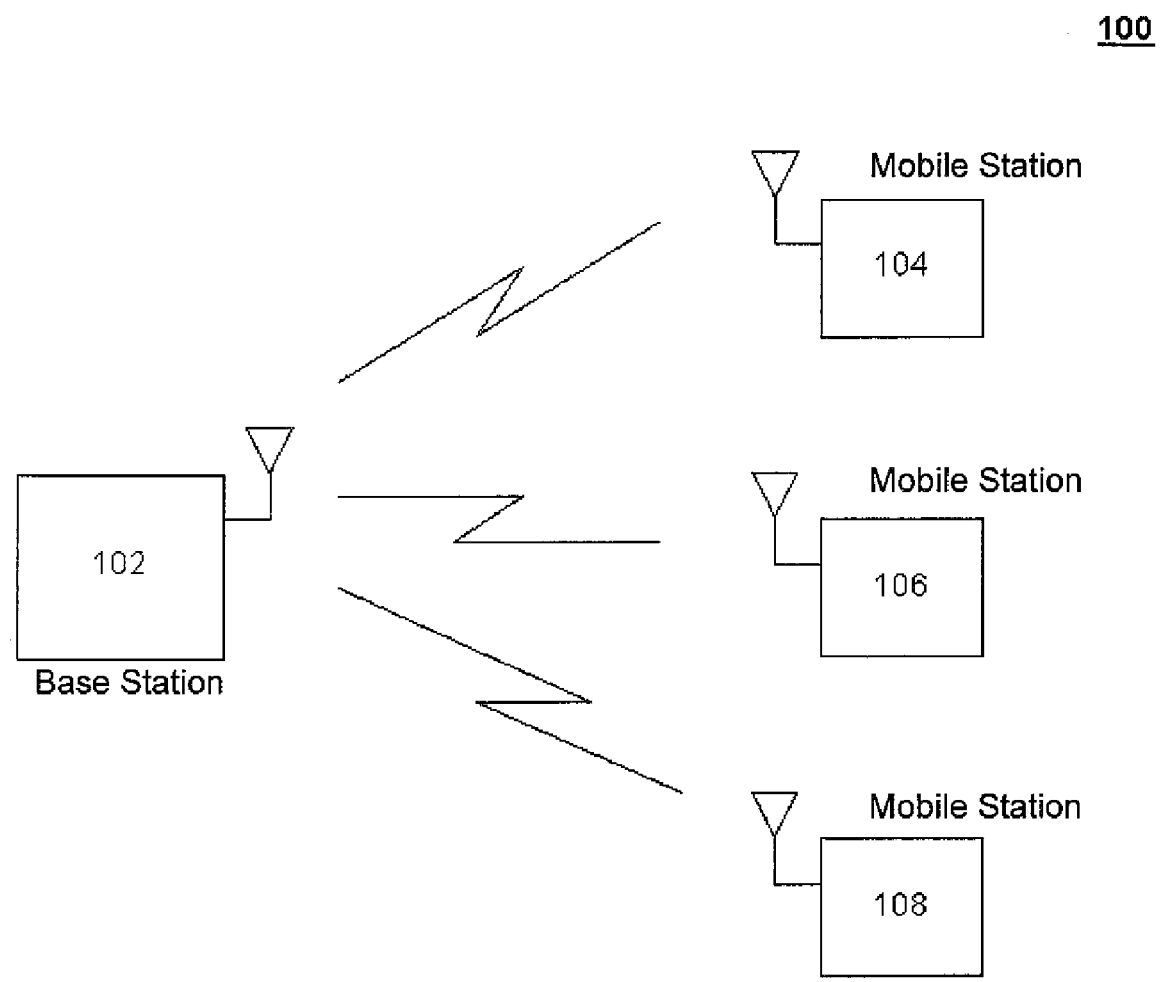
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media. A network node ("node") in this context may include any wireless device capable of communicating information over radio frequencies (RF), such as a mobile telephone, a computer or personal digital assistant (PDA) equipped with a microphone and wireless modem, a base station (BS), a mobile subscriber station (MSS) and so forth.

More particularly, system 100 may comprise a base station 102 in communication with one or more mobile stations, such as mobile stations 104, 106 and 108. The mobile stations typically comprise a microphone, speaker, radio transceiver and antenna. The mobile stations communicate by RF energy to a base station within its cell. The base station may also comprise an antenna, radio transceiver and other equipment to convert these radio signals for transfer to a MSS via a wired or alternate communications link.

In operation, base station 102 and the mobile stations may communicate information over a given RF spectrum in accordance with one or more wireless communication protocols. The assigned RF spectrum is typically a finite resource, and therefore has a bandwidth limitation that is dependent on the type of transport protocol used to communicate the information. The term "information" as used herein may refer to any data capable of being represented as a signal. Examples of information in this context may include data from a voice conversation, videoconference, streaming video, electronic mail ("email") message, voice mail message, alphanumeric symbols, graphics, image, video, text and so forth. Although FIG. 1 shows only one base station and three mobile stations, it can be appreciated that any number of network nodes may be used in system 100 and still fall within the scope of the invention. Furthermore, the terms "connection" and "interconnection," and variations thereof, in this context may refer to physical connections and/or logical connections.

Figure 2:
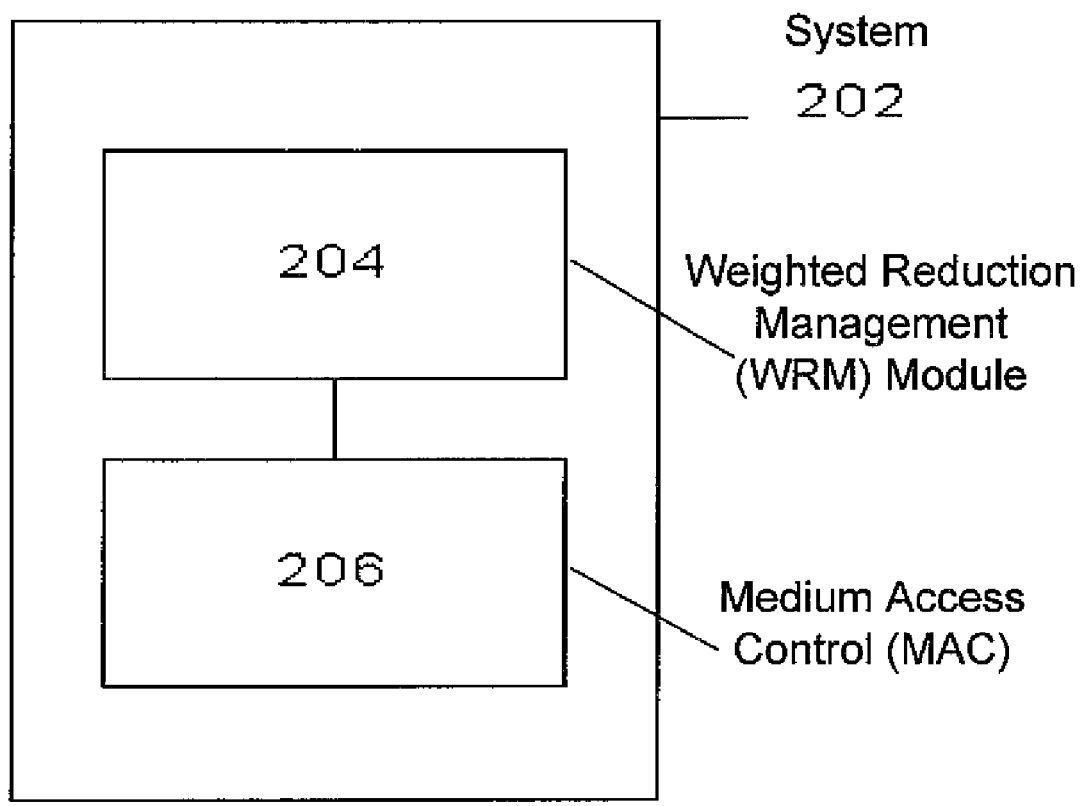
FIG. 2 is a block diagram of a weighted reduction system in accordance with one embodiment of the invention.

FIG. 2 illustrates a block diagram of a weight reduction system in accordance with one embodiment of the invention. FIG. 2 may illustrate a system 202 that incorporates functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

A network node such as a wireless device may communicate different types of information using different logical channels. Each logical channel may correspond to a different connection with specific requirements in terms of Quality of Service (QoS). Therefore, techniques may be implemented to ensure an efficient and relatively fair scheduling of data belonging to different logical channels. For example, the data from several applications running in parallel may have to be multiplexed on a single transport channel with a fixed data rate. The embodiments of the invention may attempt to reduce the instantaneous data rates for one or more logical channels in the case where the combined instantaneous data rates for the logical channels exceed the fixed data rate for a particular wireless device.

In one embodiment of the invention, system 202 may comprise a Weighted Reduction Management (WRM) module 204 and a Medium Access Control (MAC) 206. System 202 may be implemented as part of, for example, a network node such as mobile stations 104, 106 and 108.

MAC 206 may implement a given MAC protocol to map the logical channels to one or more transport channels. Since a wireless device may use more than one logical channel and transport channel at a time, it is the responsibility of MAC 206 to assign the instantaneous data rates to the transport channels. The data rates for a particular transport channel may be represented by a Transfer Format (TF), which is internally represented as a number of blocks to be transported and the size of the blocks. A given combination of data rates of the transport channels is typically referred to as a Transfer Format Combination (TFC). MAC 206 may maintain a list of different TFCs. MAC 206 may select a TFC based on the combined data rate requirements and priorities of a given set of logical channels. Selection parameters may vary according to a given transport protocol. For example, the Third Generation Partnership Project (3GPP) Specification TS 25.321 available from the 3GPP website ("3GPP Specification") provides the following constraints:

1. No other TFC shall allow the transmission of more highest priority data than the chosen TFC;

2. No other TFC shall allow the transmission of more data from the next lower priority logical channels. This criterion should be applied recursively for the remaining priority levels.

3. No other TFC shall have a lower bit rate than the chosen TFC.

WRM 204 may manage the weighted reduction of bandwidth requirements for one or more logical channels. The logical channels may be managed in accordance with the MAC protocol, although the embodiments are not limited in this context. WRM 204 may be implemented as part of the MAC protocol, or as a separate module operating in conjunction with the MAC protocol. WRM 204 may perform weighted reduction using a weighted reduction table. An example of a weighted reduction table may be illustrated using Table 1 as follows:

TABLE 1

| Application Type | Priority | Packet Size | Reduction Factor | Retry Count |
|---|---|---|---|---|
| Voice | 2 | Fixed | 0 | 0 |
| Browsing | 6 | Variable | 0.2 | 1 |
| Back Ground | 8 | Variable | 0.4 | 2 |

A weighted reduction table may comprise any number of parameters, such as Application Type, Priority, Packet Size, Reduction Factor, Retry Count, Instantaneous Data Rate and so forth. For purposes of this example, Table 1 illustrates Application Type, Priority, Packet Size, Reduction Factor and Retry Count. Application Type may refer to the type of application generating the information for a given logical channel. Priority may refer to the priority level for a given application. Packet Size may refer to the size of each packet of information for a given application. Reduction Factor may refer to the amount of reduction to apply to the instantaneous data rate of a given application, if needed. The Reduction Factor may be expressed, for example, as a percentage. Retry Count may refer to the number of times the Reduction Factor is to be applied to the instantaneous data rate of a given application.

As illustrated in Table 1, each logical channel may be assigned a priority based on a QoS requirement. Table 1 assumes eight priority levels, with priority level 1 being the highest and priority level 8 being the lowest. For example, voice information has a high QoS requirement and therefore may be assigned a higher priority, e.g., priority level 2. Browsing information, however, may have a low QoS requirement and therefore may be assigned a lower priority, e.g., priority level 6. In some instances, MAC 206 may not have a TFC that satisfies all the instantaneous data rate requirements of the logical channels. WRM 204 may use one or more parameters from the weighted reduction table to reduce the instantaneous data rate associated with a given logical channel in a controlled manner. For example, lower priority applications may have their instantaneous data rates reduced before higher priority applications. The configurable parameters ensure that the same priority logical channels are given equal importance, and also ensure that lower priority logical channels are serviced in a fair manner. Since the parameters for a given weighted reduction table may be changed, WRM 204 may be configured for a particular system or design constraints.

Figure 3:
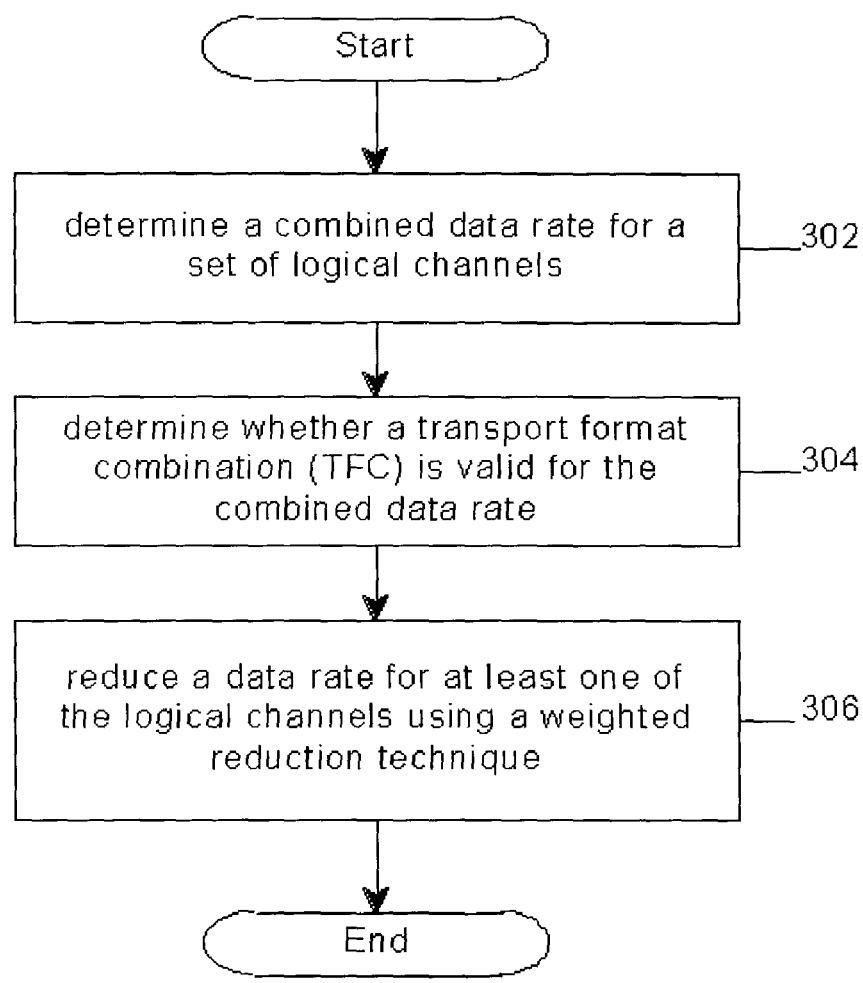
FIG. 3 is a first block flow diagram of programming logic for a Weighted Reduction Management (WRM) module in accordance with one embodiment of the invention.
Figure 4:
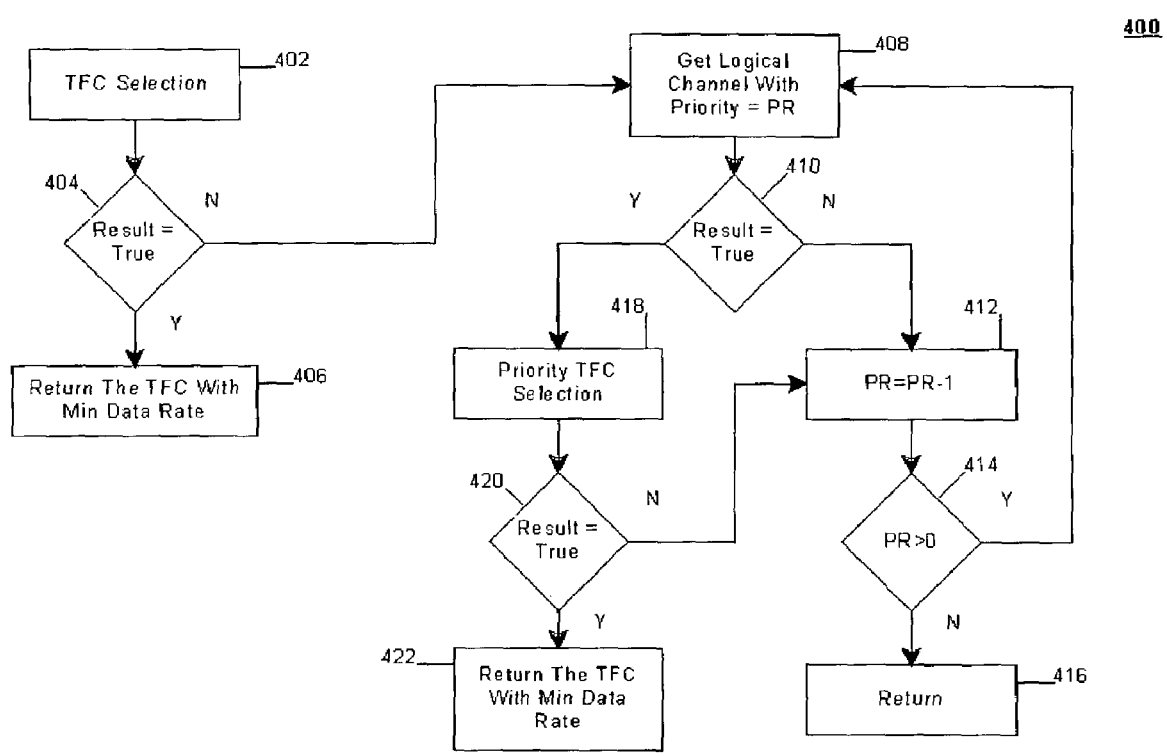
FIG. 4 is a second block flow diagram of programming logic for a Weighted Reduction Management (WRM) module in accordance with one embodiment of the invention.

The operations of systems 100 and 202 may be further described with reference to FIGS. 3 and 4 and accompanying examples. Although FIGS. 3 and 4 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIGS. 3 and 4 are block flow diagrams of the operations performed by WRM modules in accordance with different embodiments of the invention. In one embodiment of the invention, these modules may refer to the software and/or hardware used to implement the functionality for one or more embodiments as described herein. In this embodiment of the invention, these modules may be implemented as part of a weighted reduction system, such as system 202. It can be appreciated that this functionality, however, may be implemented by any component, or combination of components, within a network node and still fall within the scope of the invention.

FIG. 3 is a first block flow diagram of programming logic for a Weighted Reduction Management (WRM) module in accordance with one embodiment of the invention. FIG. 3 illustrates a programming logic 300. Programming logic 300 may illustrate operations to manage bandwidth for a network node, such as a wireless device. A combined instantaneous data rate for a set of logical channels may be determined at block 302. A determination may be made as to whether a TFC is valid for the combined instantaneous data rate at block 304. An instantaneous data rate for at least one of the logical channels may be reduced using a weighted reduction technique at block 306. The operations of block 302, 304 and 306 may be repeated until a valid TFC is found. A valid TFC may be a TFC that meets all the bandwidth requirements for the logical channels.

The weighted reduction technique may be based on a given priority for each of the logical channels. For example, in one embodiment of the invention the weighted reduction may be implemented by selecting a logical channel based on a priority level. A determination may be made as to whether an instantaneous data rate for the logical channel should be reduced based on a retry count. The instantaneous data rate for the logical channel may be adjusted using a reduction factor in accordance with the determination based on the retry count. If the retry count has been reached, a new priority level may be selected and one or more logical channels may be examined to determine whether to reduce their instantaneous data rates.

In one embodiment of the invention, weighted reduction may be performed using a weighted reduction table. The weighted reduction table may include various parameters associated with a logical channel, such as application type, priority, packet size, reduction factor, retry count and so forth. Each application type may identify the type of information communicated by the given logical channel, such as voice information, browsing information and background information.

The operations of system 100, system 200 and FIG. 3 may be further illustrated using an example. Assume parameters for a weighted reduction table similar to those shown in Table 1. Assume the instantaneous data rates for the voice application, browsing application and background application are 100 bytes, 1000 bytes and 200 bytes, respectively. Further assume that each application generates information that is each assigned a logical channel that is mapped to a transport channel. First, we determine whether there is a TFC to accommodate the bandwidth requirements of all three logical channels. If there is no valid TFC, the logical channel having the lowest priority is selected, which is the one carrying background information. The instantaneous data rate for this logical channel is reduced by 40% to 120, e.g., (200−(200*0.4)). Again a determination may be made as to whether there is a TFC to accommodate the reduced bandwidth requirements of all three logical channels. If there is still no valid TFC, the instantaneous data rate for the background information logical channel is reduced again by 40% to 40, e.g., (200−(200*2*0.4)). The TFC is checked again, and if there is still no match then we go to another logical channel with the next lowest priority, which is the one carrying browsing information. This process may continue through all the priority levels until a valid TFC is found. It is worthy to note that in some instances, such as realtime voice applications, the reduction factor and retry count for the corresponding logical channels should be set to 0 to avoid quality of service issues.

FIG. 4 is a second block flow diagram of programming logic for a Weighted Reduction Management (WRM) module in accordance with one embodiment of the invention. FIG. 4 illustrates a programming logic 400. Programming logic 400 may represent, for example, a particular implementation of WRM 204. As shown in programming logic 400, a determination may be made as to whether there are any TFCs (F) that support the instantaneous data rates required by all the logical channels of a particular wireless device at block 402. If this set F is not empty as determined at block 404, then a TFC from F may be selected at block 406 that has the minimum bandwidth needed to maximize the number of original data bits selected or, equivalently, minimize padding bits introduced.

If set F is empty, then a logical channel with priority PR may be selected at block 408. Assume PR is initially set to 8, with 8 priority levels available for the set of logical channels. If a logical channel with priority PR is found at block 410, then priority TFC selection may be initiated at block 418. If after the priority TFC selection a valid TFC is found at block 420, then the TFC with the minimum data rate may be returned at block 422. If a valid TFC is not found after the priority TFC selection at block 420, then PR may be decremented by 1 at block 412. If PR remains greater than 0, then the next logical channel with the new priority PR may be selected at block 408, and the process may continue for another iteration. If PR is not greater than 0, then the operation may return at block 416.

Figure 5:
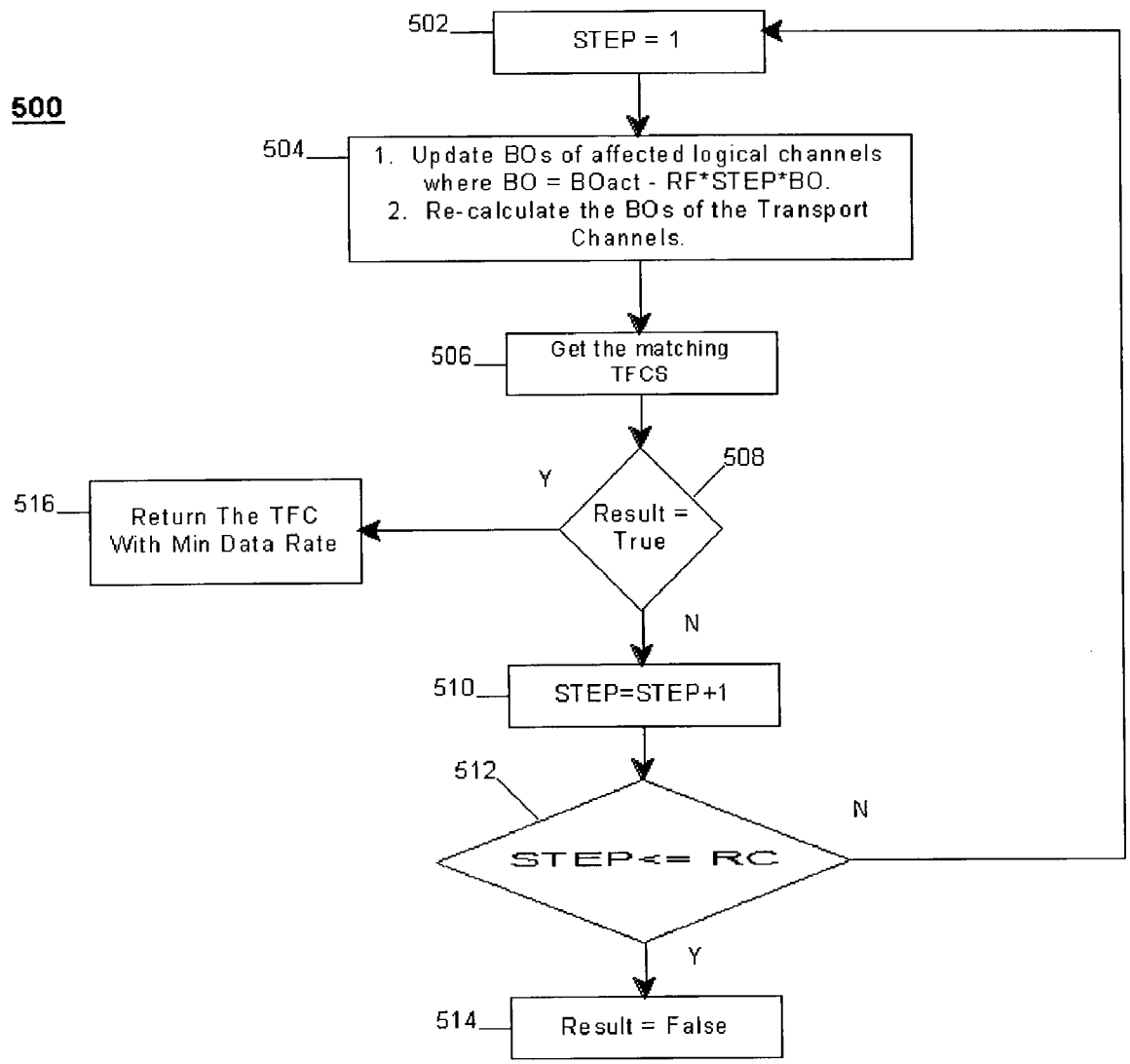
FIG. 5 is a third block flow diagram of programming logic for a Weighted Reduction Management (WRM) module in accordance with one embodiment of the invention.

FIG. 5 is a third block flow diagram of programming logic for a Weighted Reduction Management (WRM) module in accordance with one embodiment of the invention. FIG. 5 illustrates a programming logic 500, which may be representative of the programming logic for priority TFC selection at block 418. As shown in FIG. 5, the retry count (STEP) is set to 1 at block 502. At block 504, two operations may occur. First, the BOs of affected logical channels may be updated (e.g., BOact—Reduction Factor*STEP*BO). Second, the BOs of the transport channels may be recalculated. A Transport Format Combination Set (TFCS) may be retrieved at block 506. If the retrieved TFC Set is not empty at block 508 then a TFC with a minimum data rate may be returned at block 516. If the retrieved TFC Set is empty, the STEP is incremented by 1 at block 510. If STEP is less than or equal to the retry count for the logical channel, then the result is FALSE at block 514. If STEP is not less than or equal to the retry count, then control is passed to block 502 to repeat the process.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to manage bandwidth, comprising:
   a) assigning a priority, reduction factor and retry count for a set of logical channels;
   b) determining a combined instantaneous data rate for said set of logical channels;
   c) determining whether a transport format combination (TFC) is valid for said combined instantaneous data rate;
   d) reducing an instantaneous data rate for at least one of said logical channels using a weighted reduction technique, said weighted reduction techniciue utilizing said priority, reduction factor and retry count.

2. The method of claim 1, further comprising repeating operations b) and c) until a TFC is valid.

3. The method of claim 1, wherein said weighted reduction is based on a given priority for each of said logical channels.

4. The method of claim 1, wherein said determining whether a TFC is valid comprises:
   comparing said combined instantaneous data rate to at least one TFC; and
   retrieving said TFC if there is a match in accordance with said comparison.

5. The method of claim 1, wherein said instantaneous data rates are represented as a number of transport blocks and a transport block size.

6. The method of claim 1, wherein said logical channel communicates information associated with an application type.

7. The method of claim 6, wherein said application type may comprise one of a group comprising a voice application, a browsing application and a back ground application.

8. A method to manage bandwidth, comprising:
   a) determining a combined instantaneous data rate for a set of logical channels;
   b) determining whether a transport format combination (TFC) is valid for said combined instantaneous data rate; and
   c) reducing an instantaneous data rate for at least one of said logical channels using a weighted reduction technique, wherein said reducing comprises:
      a) selecting a logical channel based on a priority level;
      b) determining whether an instantaneous data rate for said logical channel should be reduced based on a retry count; and
      c) adjusting said instantaneous data rate for said logical channel using a reduction factor in accordance with said determination.

9. A method to manage bandwidth, comprising:
   a) determining a combined instantaneous data rate for a set of logical channels;
   b) determining whether a transport format combination (TFC) is valid for said combined instantaneous data rate; and
   c) reducing an instantaneous data rate for at least one of said logical channels using a weighted reduction technique, wherein said reducing comprises:
      a) selecting a logical channel based on a priority level;
      b) determining whether an instantaneous data rate for said logical channel should be reduced based on a retry count; and
      c) adjusting said instantaneous data rate for said logical channel using a reduction factor in accordance with said determination; and
      d) selecting a new priority level if said logical channel should not be reduced based on said retry count.

10. A method to manage bandwidth, comprising:
    a) storing a priority, reduction factor and retry count for each logical channel in a weighted reduction table
    b) determining a combined instantaneous data rate for a set of logical channels;
    c) determining whether a transport format combination (TFC) is valid for said combined instantaneous data rate;
    d) reducing an instantaneous data rate for at least one of said logical channels using a weighted reduction technique, said weighted reduction technique utilizing said weighted reduction table.

11. An article comprising:
    a storage medium;
    said storage medium including stored instructions that, when executed by a processor, result in managing bandwidth by a) assigning a priority, reduction factor and retry count for each logical channel, b) determining a combined instantaneous data rate for a set of logical channels, c) determining whether a transport format combination (TFC) is valid for said combined instantaneous data rate, d) reducing an instantaneous data rate for at least one of said logical channels using a weighted reduction technique, said weighted reduction technique utilizing said priority, reduction factor and retry count.

12. The article of claim 11, wherein the stored instructions, when executed by a processor, farther result in repeating operations b) and c) until a TFC is valid.

13. The article of claim 11, wherein the stored instructions, when executed by a processor, farther result in determining whether a TFC is valid by comparing said combined instantaneous data rate to at least one TFC, and retrieving said TFC if there is a match in accordance with said comparison.

14. An article comprising:
    a storage medium;
    said storage medium including stored instructions that, when executed by a processor, result in managing bandwidth by a) determining a combined instantaneous data rate for a set of logical channels, b) determining whether a transport format combination (TFC) is valid for said combined instantaneous data rate, and c) reducing an instantaneous data rate for at least one of said logical channels using a weighted reduction technique, wherein the stored instructions, when executed by a processor, further result in said reducing by a) selecting a logical channel based on a priority level, b) determining whether an instantaneous data rate for said logical channel should be reduced based on a retry count, and c) adjusting said instantaneous data rate for said logical channel using a reduction factor in accordance with said determination.

15. An article comprising:
    a storage medium;
    said storage medium including stored instructions that, when executed by a processor, result in managing bandwidth by a) determining a combined instantaneous data rate for a set of logical channels, b) determining whether a transport format combination (TFC) is valid for said combined instantaneous data rate, and c) reducing an instantaneous data rate for at least one of said logical channels using a weighted reduction technique, wherein the stored instructions, when executed by a processor, further result in said reducing by a) selecting a logical channel based on a priority level, b) determining whether an instantaneous data rate for said logical channel should be reduced based on a retry count, and c) adjusting said instantaneous data rate for said logical channel using a reduction factor in accordance with said determination, wherein the stored instructions, when executed by a processor, further result in selecting a new priority level if said logical channel should not be reduced based on said retry count.

16. An article comprising:
a storage medium;
said storage medium including stored instructions that, when executed by a processor, result in managing bandwidth by a) storing a priority, reduction factor and retry count for each logical channel in a weighted reduction table, b) determining a combined instantaneous data rate for a set of logical channels, c) determining whether a transport format combination (TFC) is valid for said combined instantaneous data rate, and d) reducing an instantaneous data rate for at least one of said logical channels using a weighted reduction technique, said weighted reduction technique utilizing said weighted reduction table.

17. A system, comprising:
a computing platform adapted to manage bandwidth;
said platform being further adapted to a) assign a priority, reduction factor and retry count for each logical channel, b) determine a combined instantaneous data rate for a set of logical channels, c) determine whether a transport format combination (TFC) is valid for said combined instantaneous data rate, d) reduce an instantaneous data rate for at least one of said logical channels using a weighted reduction technique, said weighted reduction technique utilizing said priority, reduction factor and retry count.

18. The system of claim 17, wherein said platform is further adapted to repeating operations b) and c) until a TFC is valid.

19. The system of claim 17, wherein said platform is further adapted to determining whether a TFC is valid by comparing said combined instantaneous data rate to at least one TFC, and retrieving said TFC if there is a match in accordance with said comparison.

20. A system, comprising:
a computing platform adapted to manage bandwidth;
said platform being further adapted to a) determine a combined instantaneous data rate for a set of logical channels, b) determine whether a transport format combination (TFC) is valid for said combined instantaneous data rate, and c) reduce an instantaneous data rate for at least one of said logical channels using a weighted reduction technique, wherein said platform is further adapted to perform said reducing by a) selecting a logical channel based on a priority level, b) determining whether an instantaneous data rate for said logical channel should be reduced based on a retry count, and c) adjusting said instantaneous data rate for said logical channel using a reduction factor in accordance with said determination.

21. A system, comprising:
a computing platform adapted to manage bandwidth;
said platform being further adapted to a) determine a combined instantaneous data rate for a set of logical channels, b) determine whether a transport format combination (TFC) is valid for said combined instantaneous data rate, and c) reduce an instantaneous data rate for at least one of said logical channels using a weighted reduction technique, wherein said platform is further adapted to perform said reducing by a) selecting a logical channel based on a priority level, b) determining whether an instantaneous data rate for said logical channel should be reduced based on a retry count, and c) adjusting said instantaneous data rate for said logical channel using a reduction factor in accordance with said determination, wherein said platform is further adapted to select a new priority level if said logical channel should not be reduced based on said retry count.

22. A computing platform adapted to manage bandwidth;
said platform being further adapted to a) store a priority, reduction factor and retry count for each logical channel in a weighted reduction table, b) determine a combined instantaneous data rate for a set of logical channels, c) determine whether a transport format combination (TFC) is valid for said combined instantaneous data rate, and d) reduce an instantaneous data rate for at least one of said logical channels using a weighted reduction technique, said weighted reduction technique utilizing said weighted reduction table.

* * * * *

UNITED STATES PATENT AND TRADEMARK OFFICE
CERTIFICATE OF CORRECTION

| | | |
|---|---|---|
| PATENT NO. | : 7,333,433 B2 | Page 1 of 1 |
| APPLICATION NO. | : 10/299241 | |
| DATED | : February 19, 2008 | |
| INVENTOR(S) | : Sampath | |

It is certified that error appears in the above-identified patent and that said Letters Patent is hereby corrected as shown below:

In column 7, line 16, in Claim 1, delete "techniciue" and insert -- technique --, therefor.

In column 8, line 8, in Claim 10, after "table" insert -- ; --.

In column 8, line 32, in Claim 12, delete "farther" and insert -- further --, therefor.

In column 8, line 35, in Claim 13, delete "farther" and insert -- further --, therefor.

Signed and Sealed this

First Day of July, 2008

JON W. DUDAS
*Director of the United States Patent and Trademark Office*